(12) United States Patent
Schneider et al.

(10) Patent No.: US 8,840,137 B2
(45) Date of Patent: Sep. 23, 2014

(54) BELT INTEGRATED AIRBAG

(71) Applicant: Autoliv ASP, Inc., Ogden, UT (US)

(72) Inventors: David W. Schneider, Waterford, MI (US); Patrick Patercsak, Davisburg, MI (US); Raj Valera, Rochester, MI (US)

(73) Assignee: Autoliv ASP, Inc., Ogden, UT (US)

( * ) Notice: Subject to any disclaimer, the term of this patent is extended or adjusted under 35 U.S.C. 154(b) by 0 days.

(21) Appl. No.: 13/709,263

(22) Filed: Dec. 10, 2012

(65) Prior Publication Data

US 2014/0159350 A1 Jun. 12, 2014

(51) Int. Cl.
*B60R 21/18* (2006.01)

(52) U.S. Cl.
CPC ..................... *B60R 21/18* (2013.01)
USPC ........................ 280/733; 280/743.2

(58) Field of Classification Search
USPC ............... 280/729, 733, 743.2, 808; 297/468, 297/470–472
See application file for complete search history.

(56) References Cited

U.S. PATENT DOCUMENTS

| | | | | |
|---|---|---|---|---|
| 3,888,503 | A * | 6/1975 | Hamilton | 280/733 |
| 5,465,999 | A * | 11/1995 | Tanaka et al. | 280/733 |
| 6,224,089 | B1 * | 5/2001 | Uchiyama et al. | 280/728.2 |
| 6,237,945 | B1 * | 5/2001 | Aboud et al. | 280/733 |
| 6,244,621 | B1 * | 6/2001 | Kameyoshi et al. | 280/733 |
| 6,276,715 | B1 * | 8/2001 | Takeuchi | 280/733 |
| 6,286,860 | B1 * | 9/2001 | Adomeit et al. | 280/733 |
| 6,692,020 | B2 * | 2/2004 | Decomps et al. | 280/733 |
| 7,571,931 | B2 * | 8/2009 | Watanabe | 280/733 |
| 8,585,084 | B1 * | 11/2013 | Schneider | 280/733 |
| 2002/0011723 | A1 * | 1/2002 | Lewis | 280/735 |
| 2007/0013175 | A1 * | 1/2007 | Suyama et al. | 280/733 |
| 2009/0236828 | A1 * | 9/2009 | Foubert et al. | 280/728.2 |
| 2009/0283994 | A1 * | 11/2009 | Ruthinowski et al. | 280/733 |
| 2011/0187087 | A1 * | 8/2011 | Kibat | 280/730.2 |
| 2012/0248747 | A1 * | 10/2012 | Sugimoto et al. | 280/729 |
| 2013/0264803 | A1 * | 10/2013 | Schneider et al. | 280/733 |

FOREIGN PATENT DOCUMENTS

JP    2009209497 A  *  9/2009

OTHER PUBLICATIONS

Yokoi et al., Base Fabric for Air Bag, Sep. 17, 2009, JPO, JP 2009-209497 A, Machine Translation of Description.*
Yokoi et al., Base Fabric for Air Bag, Sep. 17, 2009, JPO, JP 2009-209497 A, English Abstract.*
Yokoi et al., Base Fabric for Air Bag, published 2009, Derwent, 2009-N62823, Derwent Translation of Abstract.*

* cited by examiner

*Primary Examiner* — James English
(74) *Attorney, Agent, or Firm* — Harness, Dickey & Pierce, P.L.C.

(57) ABSTRACT

A restraint system for a seat is provided and may include a first portion having a first end fixed for movement with the seat and a second end movable relative to the seat. The restraint system may also include a second portion having a first end fixed for movement with the seat and a second end movable relative to the seat and selectively attached to the second end of the first portion. An inflator may be associated with the second portion and may move the second portion from a pre-deployed state to an inflated state. The inflator may be at least partially disposed within the second portion.

24 Claims, 5 Drawing Sheets

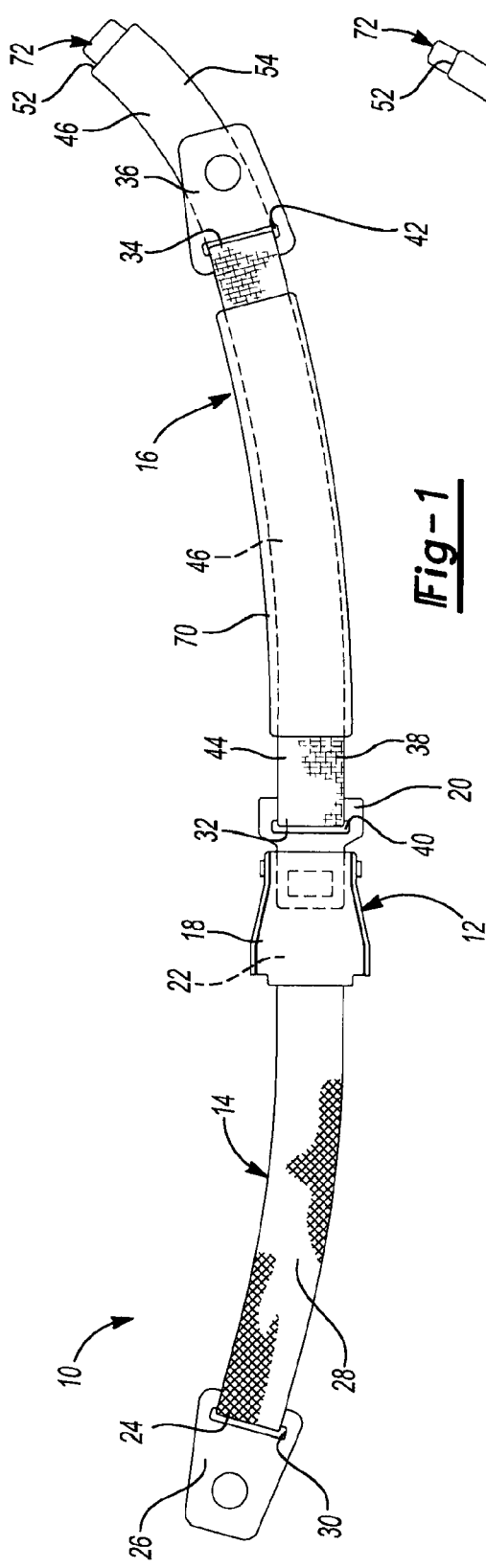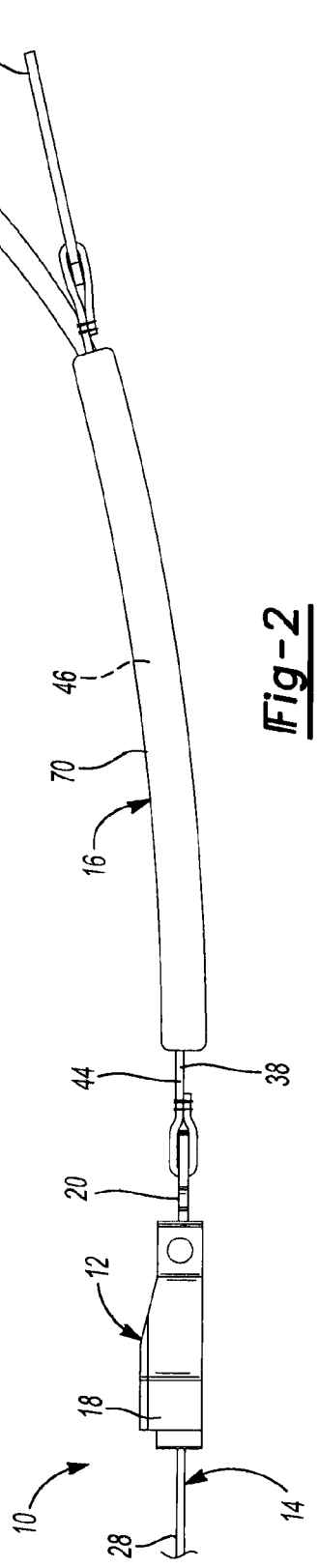

BELT INTEGRATED AIRBAG

FIELD

The present disclosure relates to a belt-integrated airbag and more particularly to a belt-integrated airbag having an improved mounting arrangement for an inflator.

BACKGROUND

This section provides background information related to the present disclosure which is not necessarily prior art.

Mobile platforms such as vehicles typically include one or more airbags that work in conjunction with one another and with other safety systems to absorb or otherwise dissipate energy associated with an impact event away from occupants of the mobile platform. For example, airbags may be located within a steering wheel, an instrument panel, a roof rail, and/or seat assemblies of a vehicle. The various airbags work in conjunction with one another and with other vehicle-safety systems such as cross-car beams, seatbelts, and pre-tensioning devices to properly manage energy associated with an impact event and to improve occupant safety.

While the foregoing components work in conjunction with one another and are often sequenced to perform at different times during an impact event, the various components are separate and, as such, are typically positioned at different locations within the vehicle. Further, while the foregoing components adequately protect vehicle occupants, many of the safety systems cannot be easily incorporated into non-automotive applications. For example, frontal airbags typically disposed within a steering wheel and/or an instrument panel of a vehicle and side-curtain airbags typically disposed within a roof rail or pillar of a vehicle cannot readily be incorporated into an aircraft application or other mobile platforms that don't include similar structure. As a result, airbags and related safety systems are typically application-specific and, therefore, must be specifically designed for the particular mobile platform (i.e., automotive vehicle, train, bus, aircraft, etc.) and associated structure.

Recently, however, airbags have been incorporated into seat structures and related components that are common to mobile platforms in an effort to utilize a common airbag across various mobile platforms and to provide an airbag at each seating location. Namely, airbags have recently been incorporated into seatbacks of mobile platforms and/or have been mechanically attached to the webbing of seatbelts at an outer surface thereof to allow the airbag to be used in a variety of mobile platforms without requiring mounting of the airbag in the surrounding structure of the particular mobile platform. Mounting an airbag in a seatback or on a seatbelt obviates the need to support the airbag in a surrounding structure of a mobile platform such as a steering wheel, instrument panel, or bulkhead and, further, allows the airbag to be used across various mobile platforms and at each seating location of the mobile platforms without regard to the surrounding structure.

Conventional airbag assemblies that are attached to the webbing of a seatbelt typically include an externally mounted inflator. Such inflators are usually attached to the airbag via a manifold that directs pressurized gas from the inflator to the airbag. While such assemblies function adequately, use of a manifold increases the potential for gas leakage—both at the junction of the manifold and the airbag and at the junction of the manifold and the inflator. Further, requiring use of a manifold increases the weight and complexity of the assembly due to the increased number of components and also increases the manufacturing operations required to produce the assembly. As a result, the overall cost of producing the airbag assembly is increased.

SUMMARY

This section provides a general summary of the disclosure, and is not a comprehensive disclosure of its full scope or all of its features.

A restraint system for a seat is provided and may include a first portion having a first end fixed for movement with the seat and a second end movable relative to the seat. The restraint system may also include a second portion having a first end fixed for movement with the seat and a second end movable relative to the seat and selectively attached to the second end of the first portion. An inflator may be associated with the second portion and may move the second portion from a pre-deployed state to an inflated state. The inflator may be at least partially disposed within the second portion.

In another configuration, a restraint system for a seat is provided and may include a first portion having a first end fixed for movement with the seat and a second end movable relative to the seat. The restraint system may also include a second portion having a first end fixed for movement with the seat and a second end movable relative to the seat and selectively attached to the second end of the first portion. An inflator may be associated with the second portion and may move the second portion from the pre-deployed state to the inflated state. The inflator may include an outlet disposed within the second portion to allow the inflator to supply gas directly to the second portion.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

FIG. 1 is a front view of a restraint device in accordance with the principles of the present disclosure;

FIG. 2 is a partial top view of the restraint device of FIG. 1;

Corresponding reference numerals indicate corresponding parts throughout the several views of the drawings.

DETAILED DESCRIPTION

Figure 3:
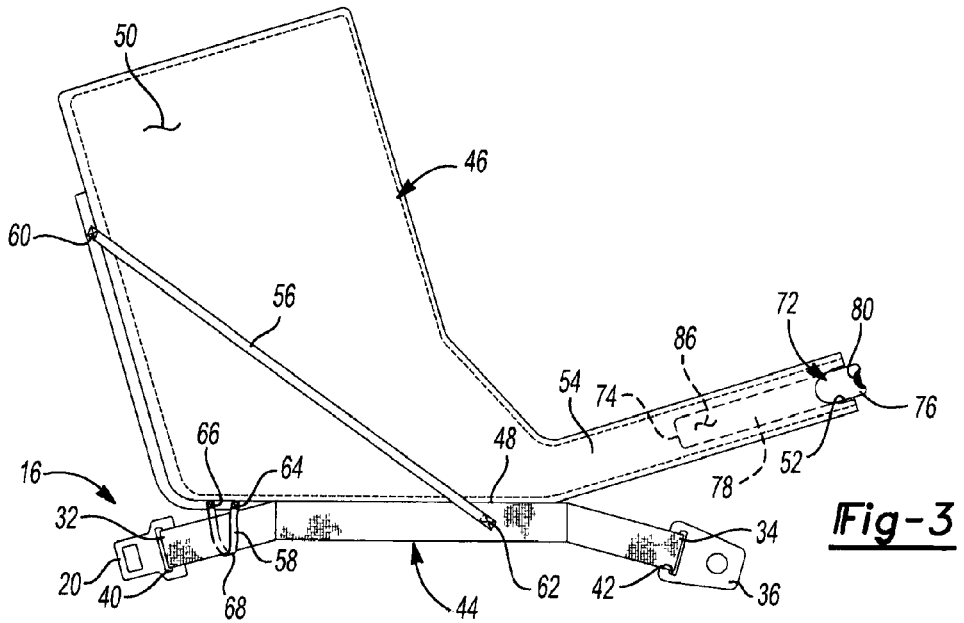
FIG. 3 is a front view of the restraint device of FIG. 1 in an unfolded state.

Example embodiments will now be described more fully with reference to the accompanying drawings.

Example embodiments are provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail.

The terminology used herein is for the purpose of describing particular example embodiments only and is not intended to be limiting. As used herein, the singular forms "a," "an," and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

When an element or layer is referred to as being "on," "engaged to," "connected to," or "coupled to" another element or layer, it may be directly on, engaged, connected or coupled to the other element or layer, or intervening elements or layers may be present. In contrast, when an element is referred to as being "directly on," "directly engaged to," "directly connected to," or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the example embodiments.

Spatially relative terms, such as "inner," "outer," "beneath," "below," "lower," "above," "upper," and the like, may be used herein for ease of description to describe one element or feature's relationship to another element(s) or feature(s) as illustrated in the figures. Spatially relative terms may be intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device may be otherwise oriented (rotated 90 degrees or at other orientations) and the spatially relative descriptors used herein interpreted accordingly.

With reference to the figures, a restraint device 10 is provided and may include a latch mechanism 12, a first segment 14, and a second segment 16. The latch mechanism 12 may be disposed between the first segment 14 and the second segment 16 and may be movable between an unlatched state permitting separation of the first segment 14 and the second segment 16 and a latched state joining the first segment 14 and second segment 16.

The latch mechanism 12 may include a buckle 18 and a tongue 20 that cooperate to selectively attach the first segment 14 and the second segment 16. Specifically, the buckle 18 may include an opening (not shown) that partially receives a portion of the tongue 20 to releasably couple the tongue 20 to the buckle 18. Coupling the tongue 20 to the buckle 18 likewise couples the first segment 14 to the second segment 16 (FIG. 1). The first segment 14 and second segment 16 may be separated when a force is applied to the buckle 18 to disengage the tongue 20 from the buckle 18. The buckle 18 and tongue 20 could be any buckle and tongue that cooperate to selectively attach the first segment 14 and the second segment 16. For example, the buckle 18 and tongue 20 could be a buckle and tongue typically employed in an aircraft application, as shown in FIG. 1 or, alternatively, could be a buckle and tongue employed in an automotive application. Further, one or both of the buckle 18 and the tongue 20 may allow for adjustment of the combined length of the first segment 14 and the second segment 16 to accommodate occupants of different sizes.

The first segment 14 may include a first end 22 that is attached to the buckle 18, a second end 24 that is attached to an anchor 26, and a main body 28 extending between the first end 22 and the second end 24. The first end 22 may be received within a portion of the buckle 18 and may be stitched or otherwise attached to itself following insertion of the first end 22 into the buckle 18 to attach the first end 22 of the first segment 14 to the buckle 18. Likewise, the second end 24 may pass through an opening 30 of the anchor 26 prior to being stitched or otherwise attached to itself to attach the second end 24 of the first segment 14 to the anchor 26. The main body 28 extends generally between the buckle 18 and the anchor 26 and may be formed from a woven material such as, for example, seatbelt webbing or airbag-cushion material. The anchor 26 may be attached to an external structure to fix the anchor 26 and, thus, the second end 24 of the first segment 14 relative to the external structure. For example, the anchor 26 may be attached to a seat structure (FIGS. 11-15) or, alternatively, to a portion of a mobile platform such as an automotive vehicle or aircraft (neither shown) that supports the seat structure.

The second segment 16 may include a first end 32, a second end 34, an anchor 36, and a main body 38 extending generally between the tongue 20 and the anchor 36. The first end 32 may be received in an opening 40 of the tongue 20 and may be stitched or otherwise attached to itself following insertion into the opening 40 to attach the first end 32 of the second segment 16 to the tongue 20. Likewise, the second end 34 may be inserted into an opening 42 of the anchor 36 and may subsequently be stitched or otherwise attached to itself following insertion of the second end 34 into the opening 42 to attach the second end 34 to the anchor 36. As with the first segment 14, the anchor 36 may be attached to an external structure to fix the anchor 36 and, thus, the second end 34 of the second segment 16 relative to the external structure. For example, the anchor 36 may be attached to a seat structure (FIGS. 11-15) or, alternatively, to a portion of a mobile platform such as an automotive vehicle or aircraft (neither shown) that supports the seat structure.

The main body 38 may extend between the tongue 20 and the anchor 36 and may be formed from an airbag-cushion material. Specifically, the main body 38 may be formed from a cut-and-sewn airbag-cushion material, a one-piece woven (OPW) airbag-cushion material, or a laminate airbag-cushion material. Because the first end 32 and the second end 34 of the second segment 16 may be integrally formed with the main body 38, the first end 32 and the second end 34 may likewise be formed from an airbag-cushion material. Alternatively, the main body 38 could include a portion formed from conventional seatbelt webbing (not shown) and a portion formed from airbag-cushion material, as will be described below.

While the restraint device 10 will be described and shown hereinafter as including a second segment 16 associated with a tongue 20 and including a main body 38 formed from an airbag-cushion material, the restraint device 10 could alternatively or additionally be constructed such that the first segment 14 includes a main body formed from an airbag-cushion material. Further, while the first segment 14 will be described and shown as including a main body 28 formed from seatbelt webbing that extends over a lap of an occupant (FIG. 11), the first segment 14 could alternatively be configured such that the buckle 18 is disposed in close proximity to the anchor 26 and is rigidly attached to the anchor 26, as would commonly be found in an automotive application. For example, the anchor 26 could be rigidly attached to the buckle 18 via a bracket or Bowden cable in an automotive seat (not shown) where the buckle 18 is positioned in close proximity to a seat bottom (not shown) of the automotive seat. If the buckle 18 is positioned in close proximity to a seat bottom of a seat assembly, the main body 38 of the second segment 16 would be elongated to allow the main body 38 to extend over an occupant while concurrently allowing the tongue 20 to be selectively received by the buckle 18.

The main body 38 extends between the tongue 20 and the anchor 36 and may include a belt portion 44 and a cushion portion 46. The belt portion 44 and the cushion portion 46 may be formed from any of the above-described airbag-cushion materials and, further, may be formed from the same airbag-cushion material. Alternatively, the belt portion 44 could be formed from conventional seatbelt webbing while the cushion portion 46 is formed from airbag-cushion material to provide the second segment 16 with an airbag movable from a pre-deployed state to an inflated state. In this configuration, the cushion portion 46 is attached to the belt portion 44 via a suitable process such as stitching and is folded relative to the belt portion 44 when in the pre-deployed state. While the belt portion 44 and the cushion portion 46 could be formed from the same or different materials, the belt portion 44 and the cushion portion 46 will be described and shown hereinafter as including a unitary construction, whereby the belt portion 44 and the cushion portion 46 are formed from the same piece of airbag-cushion material (FIG. 1).

The belt portion 44 may extend between the tongue 20 and the anchor 36 to permit forces applied to the main body 38 at the tongue 20 to be transmitted to the anchor 36 via the belt portion 44. Because the belt portion 44 serves to transmit forces from the tongue 20 to the anchor 36, the belt portion 44 must be formed from a sufficiently strong airbag-cushion material that is capable of transmitting forces from the tongue 20 to the anchor 36 without tearing. For example, the airbag-cushion material may be a so-called tight-matrix weave that provides sufficient strength to the main body 38 to allow the belt portion 44 to adequately transmit forces from the tongue 20 to the anchor 36 without tearing. Further, multiple layers or folded layers of airbag-cushion material may be utilized to provide the belt portion 44 with a desired tensile strength.

The cushion portion 46 may extend from the belt portion 44 at a junction 48 (FIG. 3) of the belt portion 44 and the cushion portion 46. The junction 48 may fluidly isolate the belt portion 44 from the cushion portion 46 or, alternatively, may permit fluid communication between the belt portion 44 and the cushion portion 46. Should the junction 48 provide fluid communication between the belt portion 44 and the cushion portion 46, a portion of the belt portion 44 may be inflated when the cushion portion 46 is inflated.

While the cushion portion 46 is described as being formed from the same material as the belt portion 44, the cushion portion 46 and the belt portion 44 may include different weave patterns and, further, may be formed from different material types to provide the respective portions 44, 46 with different strength and/or elongation properties. Specifically, the belt portion 44 and the cushion portion 46 are described as being part of the main body 38 and, thus, as being formed from a cut-and-sewn airbag-cushion material, an OPW airbag-cushion material, or a laminate airbag-cushion material. As such, the belt portion 44 and the cushion portion 46 may both be formed from the same type of material (i.e., a cut-and-sewn airbag-cushion material, OPW airbag-cushion material, or a laminate airbag-cushion material) or, alternatively, may be formed from different types of material. For example, the belt portion 44 could be formed from an OPW airbag-cushion material while the cushion portion 46 is formed from a laminate airbag-cushion material. The particular weave of each portion 44, 46 and the type of material chosen for each portion 44, 46 may be tailored to provide each portion 44, 46 with a desired strength and/or elongation property. As such, any combination of material type and weave may be selected including forming each portion 44, 46 from a material having an identical weave pattern and material type.

The cushion portion 46 may extend from the belt portion 44 at the junction 48 and may include a contact surface 50 and an opening 52 located proximate to or at a distal end of a throat 54 of the cushion portion 46. The contact surface 50 may be positioned relative to the belt portion 44 such that when the cushion portion 46 is inflated, the contact surface 50 opposes an occupant (FIGS. 11-15). The opening 52 may be disposed proximate to the junction 48 of the belt portion 44 and the cushion portion 46 and is in fluid communication with an interior of the cushion portion 46 to selectively supply the cushion portion 46 with pressurized gas.

The cushion portion 46 may additionally include break stitching (not shown) and/or may be folded to promote inflation of the cushion portion 46 in a direction away from the belt portion 44 prior to the cushion portion 46 moving in a lateral direction (i.e., in a direction substantially parallel to a longitudinal axis of the belt portion 44). The break stitching may be disposed within the interior of the cushion portion 46 and may be designed to break at a threshold pressure to allow the cushion portion 46 to first inflate in a direction substantially perpendicular to a longitudinal axis of the belt portion 44 prior to moving laterally and in a direction substantially parallel to the longitudinal axis of the belt portion 44.

The cushion portion 46 may additionally or alternatively include an external tether 56 and/or a loop tether 58. The external tether 56 may be formed from the same material as the belt portion 44 and cushion portion 46 or, alternatively, may be formed from a different material. Regardless of the particular construction of the external tether 56, the external tether 56 may extend at least partially across the contact surface 50 and may include a first end 60 attached to the cushion portion 46 and a second end 62 attached to the belt portion 44. One of the first end 60 and the second end 62 may be integrally formed with the belt portion 44 or cushion portion 46 to obviate the need to attach the external tether 56 to the belt portion 44 or cushion portion 46. The external tether 56 may guide and direct movement of the cushion portion 46, as the cushion portion 46 is inflated. Specifically, the external tether 56 may restrict lateral movement of the cushion portion 46 in a direction substantially parallel to a longitudinal axis of the belt portion 44 and may properly position the contact surface 50 of the cushion portion 46 upon full inflation of the cushion portion 46.

The loop tether 58 may include a first end 64 and a second end 66 that are both attached to the cushion portion 46. As with the external tether 56, the loop tether 58 may be constructed such that one of the first end 64 or the second end 66 is integrally formed with the cushion portion 46 to obviate the need to attach both ends 64, 66 to the cushion portion 46. The loop tether 58 may additionally include a main body 68 that extends generally between the first end 64 and the second end 66 and surrounds the belt portion 44. As with the external tether 56, the loop tether 58 acts to control the trajectory of the cushion portion 46 upon inflation.

The cushion portion 46 may include any or all of the break stitching, the external tether 56, and the loop tether 58. The cushion portion 46 may therefore utilize any or all of the break stitching, external tether 56, and loop tether 58 to control movement of the cushion portion 46 during and following inflation of the cushion portion 46 in an effort to properly position the contact surface 50 of the cushion portion 46 relative to an occupant.

The cushion portion 46 may be folded and collapsed onto the belt portion 44 when the cushion portion 46 is in a pre-deployed state. Specifically, the cushion portion 46 may be folded in an accordion shape, for example, such that the cushion portion 46 includes a substantially rectangular profile. The folded cushion portion 46 may then be positioned adjacent to the belt portion 44 and may remain in close proximity to the belt portion 44 until the cushion portion 46 is inflated. While the cushion portion 46 is described as being folded in an accordion shape having a substantially rectangular profile, the cushion portion 46 could be folded in any manner and may include virtually any profile that permits the cushion portion 46 to properly move from the pre-deployed state to the inflated state within a desired time frame while concurrently allowing the cushion portion 46 to mimic the shape of the belt portion 44 when in the pre-deployed state.

Once the cushion portion 46 is folded and is properly positioned relative to the belt portion 44, a cover 70 (FIGS. 1 and 2) may surround an outer perimeter of the belt portion 44 and the cushion portion 46. The cover 70 may surround the belt portion 44 and the cushion portion 46 to retain a desired fold pattern of the cushion portion 46 and to maintain the cushion portion 46 in close proximity to the belt portion 44 until the cushion portion 46 is inflated. The cover 70 may include a tear seam (not shown) that provides a localized region of weakness to allow the cushion portion 46 to initially move in a desired direction upon inflation of the cushion portion 46. In one configuration, the tear seam of the cover portion may be positioned to guide the cushion portion 46 in a direction substantially perpendicular to a longitudinal axis of the belt portion 44 to encourage inflation of the cushion portion 46 in a direction generally away from the belt portion 44. Further, the cushion portion 46 may be stitched to the belt portion 44 via break stitches (none shown) that break upon inflation of the cushion portion 46. Such break stitches may be used in place of or in conjunction with the cover 70 to retain the relative position of the belt portion 44 and cushion portion 46 when the cushion portion 46 is in the pre-deployed state.

The cushion portion 46 may be moved from the pre-deployed state to the inflated state by introducing pressurized gas into the interior of the cushion portion 46. Specifically, the cushion portion 46 may be in communication with an inflator 72 that is at least partially received within the throat 54 of the cushion portion 46. The inflator 72 provides the cushion portion 46 with pressurized gas to move the cushion portion 46 from the pre-deployed state to the inflated state.

Figure 4:
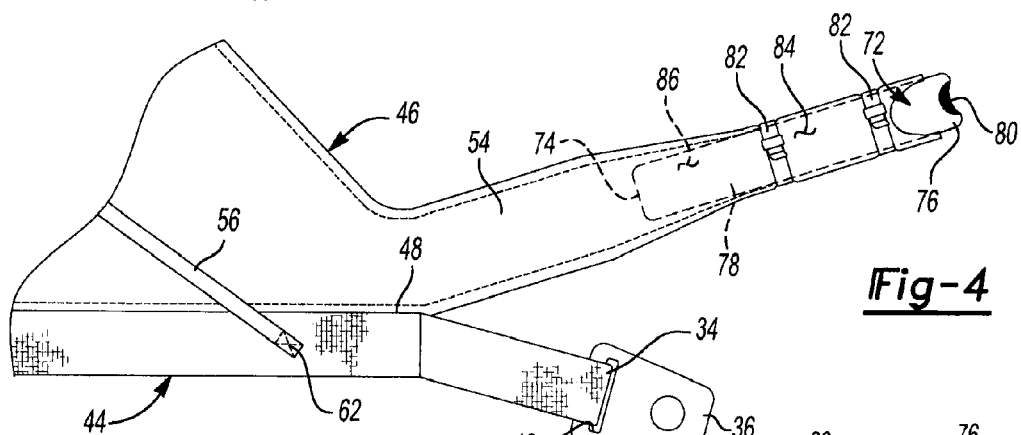
FIG. 4 is a front view of the restraint device of FIG. 1 detailing attachment of an inflator to an inflatable portion of the device of FIG. 1.
Figure 5:
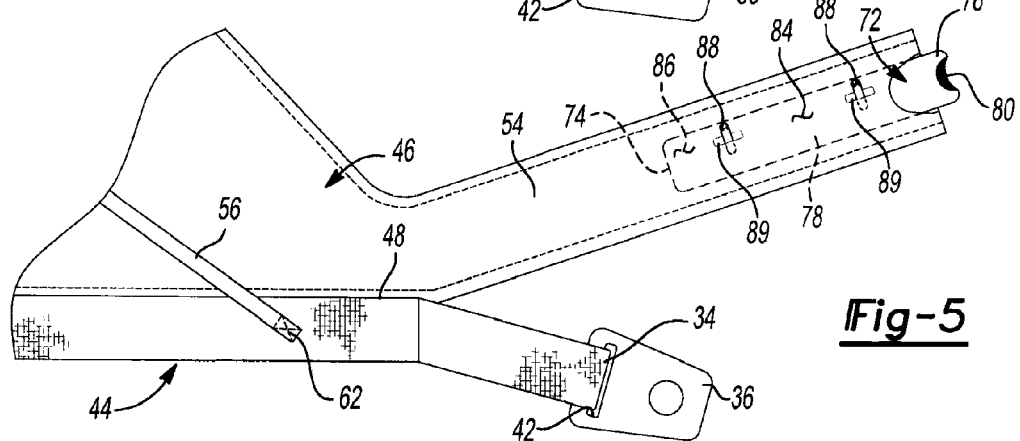
FIG. 5 is a front view of the restraint device of FIG. 1, detailing attachment of an inflator to an inflatable portion of the device of FIG. 1.
Figure 6:
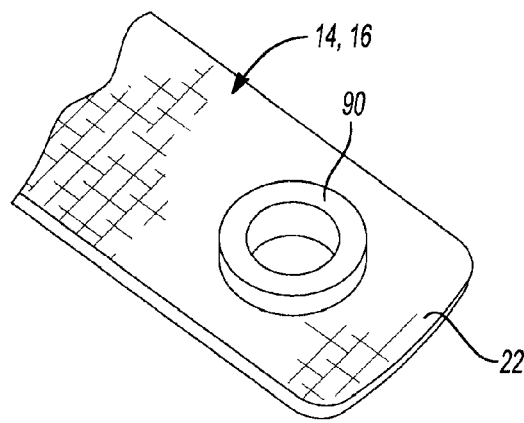
FIG. 6 is a partial perspective view of the restraint device of FIG. 1 showing an attachment feature used to attach the restraint device to an external structure.
Figure 7:
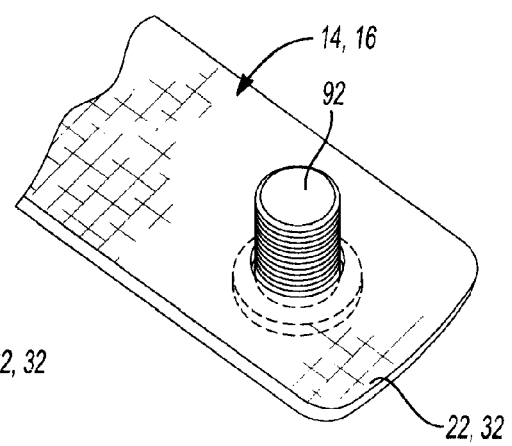
FIG. 7 is a partial perspective view of the restraint device of FIG. 1 showing an attachment feature used to attach the restraint device to an external structure.
Figure 15:
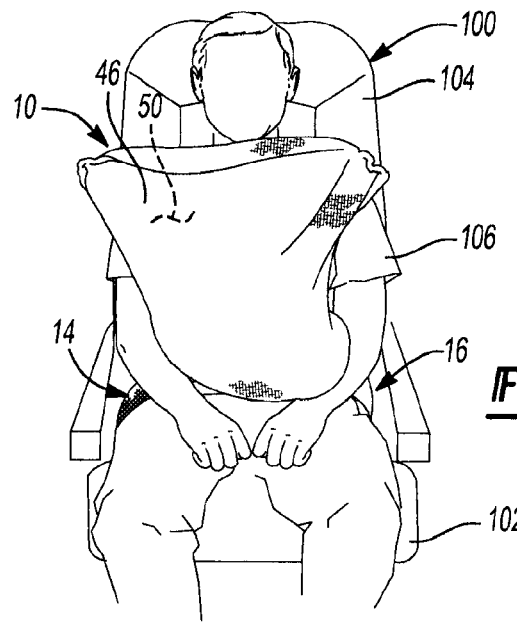
FIG. 15 is another perspective view of an occupant seated in a seat assembly incorporating the restraint device of FIG. 1 in a fully deployed state.

The inflator 72 may include a first end 74, a second end 76, and a cylindrical body 78 extending generally between the first end 74 and the second end 76. The first end 74 may be received by the opening 52 of the throat 54 such that the first end 74 and at least a portion of the cylindrical body 78 are received within the throat 54 (FIGS. 3-5). The second end 76 may extend partially from the opening 52 such that the second end 76 is exposed. The second end 76 may include an electrically actuated squib 80 that ignites a propellant (not shown) disposed within the inflator 72 when an appropriate signal is received by the squib 80. Ignition of the propellant causes the inflator 72 to generate high-pressure gas which, in turn, causes the cushion portion 46 to be moved from the pre-deployed state (FIG. 1) to the deployed state (FIG. 15).

Once the inflator 72 is received within the opening 52 and positioned at a desired location along the throat 54, a clamp 82 (FIG. 4) may be positioned around an outer surface 84 of the throat 54 and may be used to sandwich the cushion portion 46 between the clamp 82 and an outer surface 86 of the cylindrical body 78. Sandwiching the throat 54 between the clamp 82 and the outer surface 86 of the inflator 72 fixes a position of the inflator 72 relative to the throat 54 and, further, restricts passage of gas between the material of the cushion portion 46 at the throat 54 and the outer surface 86 of the inflator 72. In other words, when the inflator 72 generates high-pressure gas, the high-pressure gas is directed into the cushion portion 46 at the throat 54 and the high-pressure gas is not permitted to escape the opening 52 at a junction of the throat 54 and the outer surface 86 of the inflator 72 due to the force exerted on the throat 54 and the outer surface 86 of the inflator 72 by the clamp 82. While the inflator 72 is shown as being attached to the throat 54 of the cushion portion 46 via a pair of clamps 82 in FIG. 4, any number of clamps 82—including a single clamp 82—may be used.

When the squib 80 ignites the propellant disposed within the inflator 72, the inflator 72 generates high-pressure gas, which is directed into the cushion portion 46 via the first end 74 of the inflator 72. Because the first end 74 of the inflator 72 is disposed within the cushion portion 46 at the throat 54, the high-pressure gas exiting the first end 74 of the inflator 72 is directly received by the cushion portion 46.

The inflator 72 may alternatively be attached to the throat 54 of the cushion portion 46 via a pair of threaded studs 88 (FIG. 5). Specifically, the cylindrical body 78 may include one or more threaded studs 88 that extend from the outer surface 86 of the cylindrical body 78. The threaded studs 88 may be respectively received within apertures (not shown) formed through the cushion portion 46 at the throat 54 to allow the threaded studs 88 to protrude from the outer surface 84 of the throat 54 once the inflator 72 is properly positioned relative to the throat 54. A fastener such as a threaded nut 89 may be threadably attached to each stud 88 to sandwich a portion of the cushion portion 46 at the throat 54 between the nut 89 and the outer surface 86 of the inflator 72. Once the nuts are threadably attached to the studs 88 such that a portion of the cushion portion 46 is disposed between each nut 89 and the outer surface 86 of the cylindrical body 78, the inflator 72 is fixed for movement with the throat 54 of the cushion portion 46.

When the inflator 72 is fixed for movement with the throat 54 of the cushion portion 46, the first end 74 is received within the throat 54 such that the first end 74 is in direct communication with an inner volume of the cushion portion 46. As such, when a signal is supplied to the squib 80 to ignite the propellant of the inflator 72, the resulting high-pressure gas generated by the inflator 72 exits the first end 74 of the inflator 72 and is directly received by the cushion portion 46 at the throat 54. Injecting high-pressure gas into the cushion portion 46 at the throat 54 causes the cushion portion 46 to move from the pre-deployed state (FIG. 1) to the deployed state (FIG. 15).

While the inflator 72 is described as being at least partially received within the throat 54, the inflator 72 could be entirely received within the throat 54. Namely, the inflator 72 may be positioned within the throat 54 such that only a portion of the second end 76 is exposed. Alternatively, the inflator 72 may be positioned within the throat 54 such that a distal end of the second end 76 is substantially flush with the opening 52 of the throat 54 such that the inflator 72 is completely disposed within the throat 54. Further yet, the inflator 72 may be positioned within the throat 54 such that the opening 52 extends past a distal end of the second end 76. In fact, the inflator 72 may be completely enclosed inside the throat 54 such that the second end 76 is not exposed. In this case, the opening 52 of the throat 54 may be closed or partially closed using a flap of material—such as airbag-cushion material—that provides a small opening to permit communication between the squib 80 and a wiring harness (not shown). The flap of material may integrally formed with the throat 54 and/or may be held in position relative to the throat 54 via clamps (not shown). Additionally or alternatively, the flap of material may be received by the studs 88 of the inflator 72 to position and maintain the flap relative to the throat 54. Regardless of the particular location of the inflator 72 along a length of the throat 54, the second end 76 of the inflator 72 must be accessible to allow electrical communication with the squib 80.

With particular reference to FIGS. 6-10, installation of the restraint device 10 will be described in detail. Once the inflator 72 is fixed for movement with the cushion portion 46 at the throat 54 via either the clamps 82 or the threaded studs 88, the restraint device 10 may be installed in a mobile platform such as, for example, an automotive vehicle or an aircraft. The restraint device 10 may be attached to a structure of the mobile platform or, alternatively, may be attached to a portion of a seat (FIGS. 11-15) of the mobile platform.

Regardless of the exact attachment location of the restraint device 10, the restraint device 10 may be attached to either the structure of the mobile platform or the seat at the anchors 26, 36. Namely, a fastener may be inserted into each anchor 26, 36 to fixedly attach the first end 22 of the first segment 14 to the mobile platform/seat assembly and to fixedly attach the first end 32 of the second segment 16 to the mobile platform/seat assembly. In one configuration, the mobile platform may include weld nuts fixedly attached to the structure of the mobile platform that threadably receive fasteners. The fasteners may be inserted through the respective anchors 26, 36 and may be threadably attached to the weld nuts to fix each anchor 26, 36 and, thus, the first ends 22, 32 of the respective segments 14, 16 for movement with the mobile platform.

While the first segment 14 and the second segment 16 are shown as including first ends 22, 32 that respectively include anchors 26, 36, the first ends 22, 32 of the segments 14, 16 could alternatively include one of the various attachment devices shown in FIGS. 6-10. Specifically, the anchors 26, 36 could each be replaced with a grommet 90 (FIG. 6) that receives a projection or stud associated with the mobile platform, a threaded stud 92 that extends through an aperture (not shown) formed through the first segment 14 and the second segment 16 (FIG. 7) for attachment to the mobile platform, or retention clip 94 (FIG. 10) that is matingly received by an aperture associated with the mobile platform.

In each of the foregoing configurations, the first ends 22, 32 of the segments 14, 16 are attached to the mobile platform via elements 90, 92, 94. Specifically, the grommet 90 may receive a fastener that attaches the grommet 90 and, thus, the first ends 22, 32 to the mobile platform. Likewise, the threaded stud 92 or retention clip 94 may be used to attach the first ends 22, 32 of the segments 14, 16 to a mating receptacle of the mobile platform.

While the elements 90, 92, 94 are described as stand-alone or separate alternatives to the anchors 26, 36, some of the elements 90, 92, 94 could be used in conjunction with one another. For example, the threaded stud 92 may be inserted into the grommet 90, whereby the threaded stud 92 serves to attach the first ends 22, 32 of the segments 14, 16 to the mobile platform and the grommet 90 serves to strengthen the first ends 22, 32 in the location of the threaded stud 92.

Figure 8:
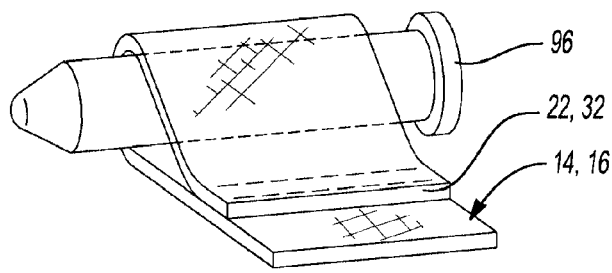
FIG. 8 is a partial perspective view of the restraint device of FIG. 1 showing an attachment feature used to attach the restraint device to an external structure.
Figure 9:
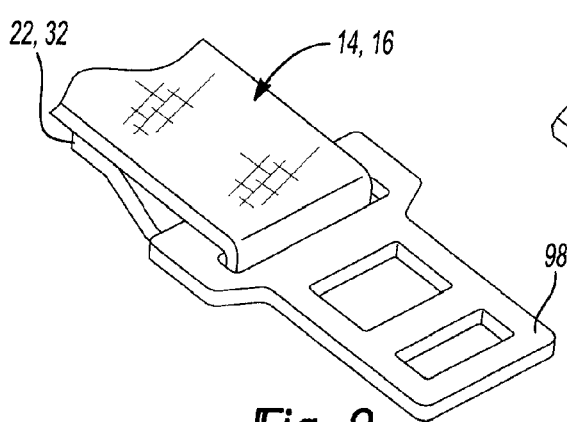
FIG. 9 is a partial perspective view of the restraint device of FIG. 1 showing an attachment feature used to attach the restraint device to an external structure.
Figure 10:
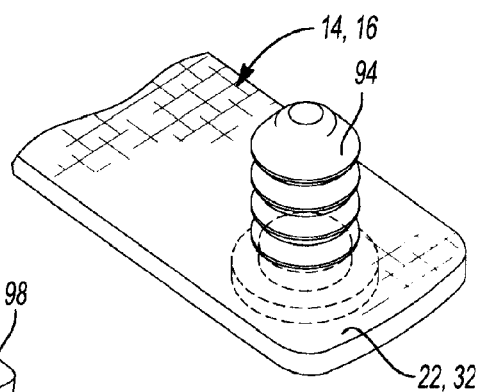
FIG. 10 is a partial perspective view of the restraint device of FIG. 1 showing an attachment feature used to attach the restraint device to an external structure.

The foregoing elements 90, 92, 94 each require an aperture to be formed in the first ends 22, 32 of the segments 14, 16 in order to install the first ends 22, 32. With particular reference to FIGS. 8 and 9, a clevis pin 96 or tongue 98 could alternatively be used to attach the first ends 22, 32 of the segments 14, 16 to the mobile platform to prevent having to form an aperture through either end 22, 32. For example, the mobile platform may include a receptacle (not shown) that receives the clevis pin 96 to thereby attach the first ends 22, 32 of the segments 14, 16 to the mobile platform. Alternatively, the mobile platform may include a buckle (not shown) that matingly receives the tongue 98 of the first ends 22, 32 of the segments 14, 16 to selectively and removably attach the first ends 22, 32 of the segments 14, 16 to the mobile platform.

The foregoing elements 96, 98 may be attached to the first ends 22, 32 of the segments 14, 16 without having to form an aperture through either end 22, 32. Namely, the ends 22, 32 may be folded relative to the main body 28 of the first segment 14 and the main body 38 of the second segment 16 and may be stitched thereto to retain the clevis pin 96 or tongue 98 at the first ends 22, 32 of the respective segments 14, 16.

Any combination of elements 26, 36, and 90-98 may be used in conjunction with the restraint device 10 to attach the first and second portions 14, 16 to the mobile platform. As such, the first segment 14 and second segment 16 may include different attachment features at the first ends 22, 32. For example, the first end 22 of the first segment 14 may include a grommet 90 that receives a threaded stud 92 while the second end 34 of the second segment 16 includes a tongue 98 selectively and removably attached to a buckle. Finally, while the foregoing elements 26, 36, 90-98 are described as attaching the first ends 22, 32 of the first segment 14 and second segment 16 to the mobile platform, any of the foregoing elements 26, 36, 90-98 may be used to attach the first ends 22, 32 of the segments 14, 16 to a seat assembly.

With particular reference to FIGS. 11-15, the restraint device 10 is shown in conjunction with a seat assembly 100. The seat assembly 100 may be attached to the mobile platform such that the seat assembly 100 is fixed for movement with the mobile platform. The seat assembly 100 may include a seat bottom 102 supporting a seatback 104. The seat bottom 102 and the seatback 104 may cooperate to provide a seating location for an occupant 106.

Figure 11:
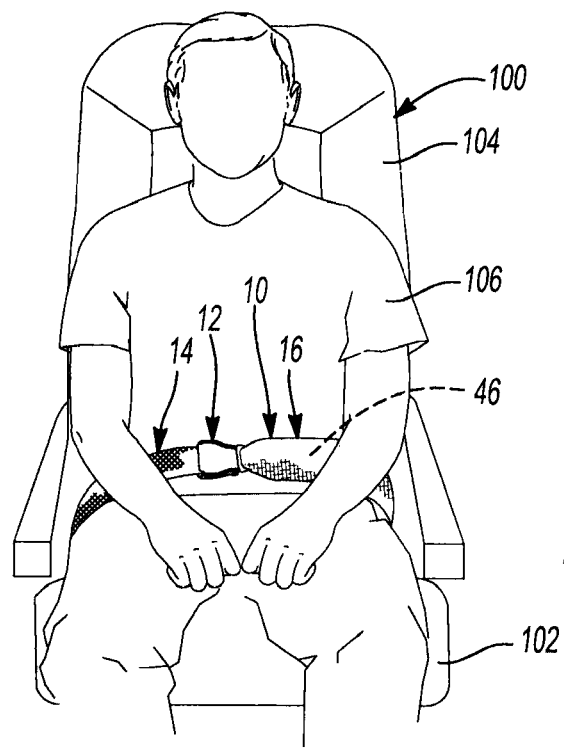
FIG. 11 is a perspective view of an occupant seated in a seat assembly incorporating the restraint device of FIG. 1 in a pre-deployed state and in a position proximate to a lap of the occupant.
Figure 12:
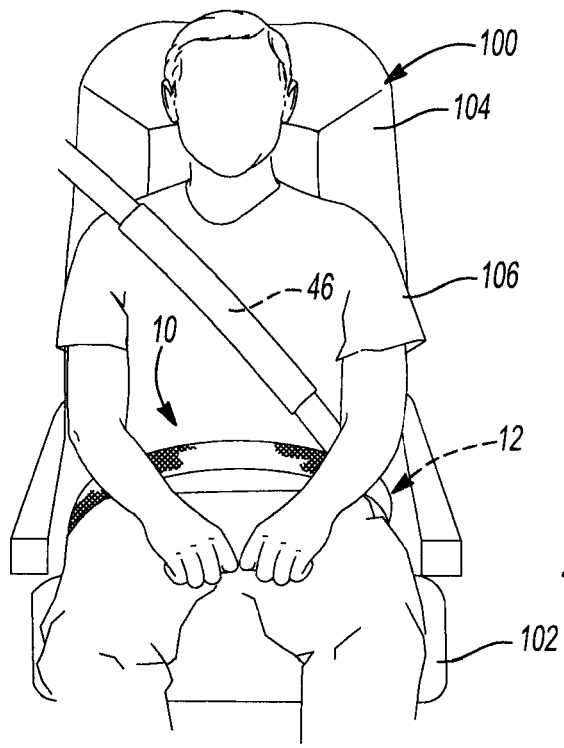
FIG. 12 is a perspective view of an occupant seated in a seat assembly incorporating the restraint device of FIG. 1 in a pre-deployed state and in a position proximate to a torso of the occupant.

The restraint device 10 may be attached such that the restraint device 10 only extends across a lap of the occupant 106 (FIG. 11). Alternatively, the restraint device 10 may include a configuration commonly found in an automotive vehicle, whereby the restraint device 10 extends across a lap of the occupant 106 as well as across a torso of the occupant 106 (FIG. 12). Should the restraint device 10 extend across both the lap and the torso of the occupant 106, the cushion portion 46 may be positioned at either the lap, as shown in FIG. 11, or may be positioned proximate to the torso of the occupant 106, as shown in FIG. 12. While the restraint device 10 may include a lap portion and a torso portion or, alternatively, may include only a lap portion, operation of the restraint device 10 will be described in conjunction with a configuration having only a lap portion.

With particular reference to FIGS. 11-15, operation of the restraint device 10 will be described in detail. The restraint device 10 may be moved from an unlatched state (not shown) to a latched state (FIG. 1) by inserting the tongue 20 into the buckle 18. Insertion of the tongue 20 into the buckle 18 attaches the first segment 14 and the second segment 16, thereby retaining an occupant 106 within a seat assembly 100. In one configuration, the anchor 26 of the first segment 14 is attached to the seat assembly 100 while the anchor 36 of the second segment 16 is likewise attached to the seat assembly 100. Therefore, inserting the tongue 20 into the buckle 18 and attaching the first segment 14 to the second segment 16 retains the occupant 106 within the seat assembly 100, as the first segment 14 and second segment 16 span a waist area of the occupant 106. While the anchors 26, 36 are described as being attached to the seat assembly 100, the anchors 26, 36 could alternatively be attached to any structure that fixes the anchors 26, 36 for movement with the seat assembly 100. For example, the anchors 26, 36 could be attached to a structure such as a floor pan or pillar (neither shown) of a mobile platform.

The seat assembly 100 may be incorporated into a mobile platform (not shown) such as an automotive vehicle, aircraft, train, or bus. Should the mobile platform experience an impact event, a signal may be sent to the squib 80 of the restraint device 10, thereby causing the inflator 72 to generate pressurized gas. The pressurized gas may flow from the inflator 72 into the cushion portion 46 via the throat 54, thereby pressurizing the cushion portion 46.

Figure 13:
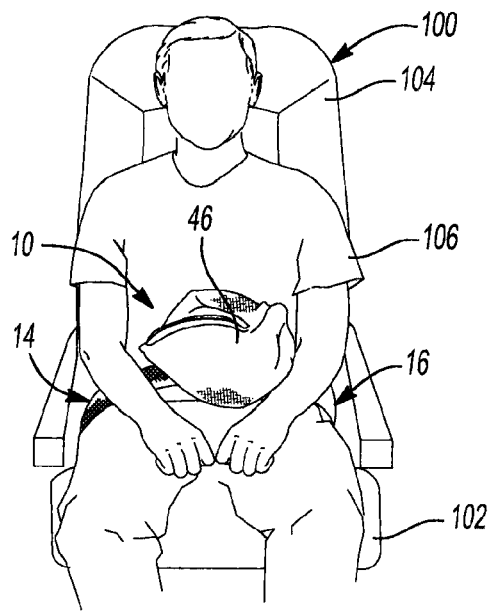
FIG. 13 is a perspective view of an occupant seated in a seat assembly incorporating the restraint device of FIG. 1 in a partially deployed state.

The internal break stitching of the cushion portion 46, in conjunction with the external tether 56 and/or loop tether 58, cause the cushion portion 46 to first inflate in a direction generally away from the belt portion 44 (FIG. 13). Specifically, the break stitching, external tether 56, and/or loop tether 58 cause the cushion portion 46 to initially extend in a direction substantially perpendicular to a longitudinal axis of the belt portion 44 such that the cushion portion 46 initially extends toward a head of the occupant 106. Once the cushion portion 46 is sufficiently inflated in a direction toward the head of the occupant 106, the break stitching disposed within the cushion portion 46 may rupture, thereby allowing the cushion portion 46 to inflate laterally across a torso of the occupant 106 and in a direction substantially parallel to the longitudinal axis of the belt portion 44 (FIG. 14).

Figure 14:
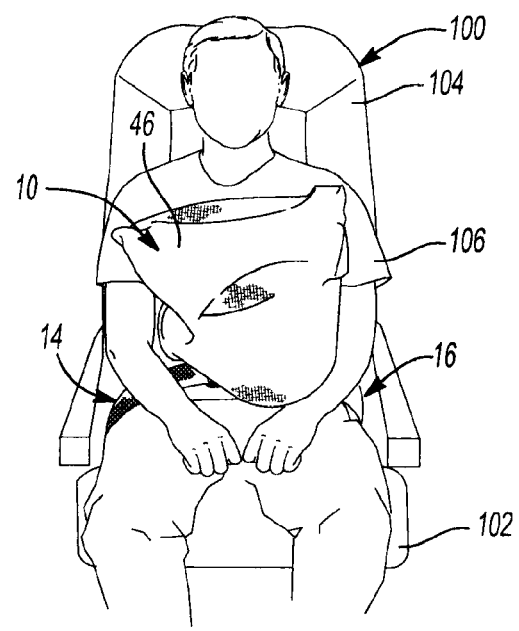
FIG. 14 is another perspective view of an occupant seated in a seat assembly incorporating the restraint device of FIG. 1 in a partially deployed state.

The external tether 56 and/or loop tether 58 may likewise permit and encourage such lateral movement of the cushion portion 46 to allow the cushion portion 46 to not only inflate toward the head of the occupant 106 but also move across the torso of the occupant 106 (FIGS. 14 and 15). Once the cushion portion 46 is fully inflated, the contact surface 50 of the cushion portion 46 opposes the head and torso of the occupant 106, thereby allowing the occupant 106 to contact the cushion portion 46 in an optimal location to allow the cushion portion 46 to absorb energy associated with movement of the occupant 106 relative to the seat assembly 100.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. A restraint system for a seat, the restraint system comprising:
   a first belt portion including a restraint portion having a first end fixed for movement with the seat via an anchor and a second end attached to one of a buckle and a tongue and an inflatable portion attached to said restraint portion and operable between a pre-deployed state and an inflated state, said restraint portion and said inflatable portion being formed from airbag cushion material;
   a second belt portion including a first end fixed for movement with the seat and a second end attached to the other of said buckle and said tongue, said second belt portion selectively attached to said second end of said restraint portion via said other of said buckle and said tongue; and
   an inflator associated with said first belt portion and operable to move said inflatable portion from said pre-deployed state to said inflated state, said inflator at least partially disposed within said first belt portion.

2. The restraint system of claim 1, wherein said inflator is retained within a throat of said inflatable portion.

3. The restraint system of claim 1, wherein said inflator is retained within a throat of said inflatable portion by a clamp that surrounds said throat.

4. The restraint system of claim 3, wherein said throat is disposed between said clamp and said inflator.

5. The restraint system of claim 3, wherein said throat is disposed between said clamp and said inflator around an entire perimeter of said inflator.

6. The restraint system of claim 1, wherein said inflator includes a first attachment feature and said inflatable portion includes a throat having a second attachment feature, said first attachment feature cooperating with said second attachment feature to retain said inflator within said throat.

7. The restraint system of claim 6, wherein said first attachment feature is a stud and said second attachment feature is an aperture, said stud received by said aperture to attach said inflator to said throat.

8. The restraint system of claim 6, wherein said first attachment feature includes two studs spaced apart from one another along a length of said inflator and said second attachment feature includes two apertures, said two studs respectively received within said two apertures to attach said inflator to said throat.

9. The restraint system of claim 1, wherein said restraint portion and said inflatable portion have a unitary construction.

10. The restraint system of claim 1, wherein said inflatable portion extends from said restraint portion at an edge of said restraint portion, said edge defining a thickness of said restraint portion that is less than a length of said restraint portion and is less than a width of said restraint portion.

11. The restraint system of claim 10, wherein said inflatable portion extends in a direction away from said edge when moved from said pre-deployed state to said inflated state to prevent said inflatable portion from overlapping said restraint portion in said inflated state, said direction being substantially perpendicular to a longitudinal axis of said restraint portion.

12. The restraint system of claim 1, further comprising a tether extending between said restraint portion and said inflatable portion, said tether including a first end attached to said restraint portion and a second end attached to said inflatable portion.

13. A restraint system for a seat, the restraint system comprising:
a first belt portion including a restraint portion having a first end fixed for movement with the seat via an anchor and a second end attached to one of a buckle and a tongue and an inflatable portion attached to said restraint portion and operable between a pre-deployed state and an inflated state, said restraint portion and said inflatable portion formed from airbag cushion material;
a second belt portion including a first end fixed for movement with the seat and a second end attached to the other of said buckle and said tongue, said second belt portion selectively attached to said second end of said restraint portion via said other of said buckle and said tongue; and
an inflator associated with said first belt portion and operable to move said inflatable portion from said pre-deployed state to said inflated state, said inflator including a first end disposed within said first belt portion to allow said inflator to supply gas directly to said first belt portion.

14. The restraint system of claim 13, wherein said inflator is retained within a throat of said inflatable portion by a clamp.

15. The restraint system of claim 14, wherein said clamp surrounds said throat to retain said inflator within said throat.

16. The restraint system of claim 14, wherein said throat is disposed between said clamp and said inflator.

17. The restraint system of claim 14, wherein said throat is disposed between said clamp and said inflator around an entire perimeter of said inflator.

18. The restraint system of claim 13, wherein said inflator includes a first attachment feature and said inflatable portion includes a throat having a second attachment feature, said first attachment feature cooperating with said second attachment feature to retain said inflator within said throat.

19. The restraint system of claim 18, wherein said first attachment feature is a stud and said second attachment feature is an aperture, said stud received by said aperture to attach said inflator to said throat.

20. The restraint system of claim 18, wherein said first attachment feature includes two studs spaced apart from one another along a length of said inflator and said second attachment feature includes two apertures, said two studs respectively received within said two apertures to attach said inflator to said throat.

21. The restraint system of claim 13, wherein said restraint portion and said inflatable portion have a unitary construction.

22. The restraint system of claim 13, wherein said inflatable portion extends from said restraint portion at an edge of said restraint portion, said edge defining a thickness of said restraint portion that is less than a length of said restraint portion and is less than a width of said restraint portion.

23. The restraint system of claim 22, wherein said inflatable portion extends in a direction away from said edge when moved from said pre-deployed state to said inflated state to prevent said inflatable portion from overlapping said restraint portion in said inflated state, said direction being substantially perpendicular to a longitudinal axis of said restraint portion.

24. The restraint system of claim 13, further comprising a tether extending between said restraint portion and said inflatable portion, said tether including a first end attached to said restraint portion and a second end attached to said inflatable portion.

* * * * *